(12) United States Patent
Flordelis et al.

(10) Patent No.: US 12,407,401 B2
(45) Date of Patent: Sep. 2, 2025

(54) CONFIGURATION OF A WIRELESS COMMUNICATION DEVICE TO FACILITATE ANGLE-OF-ARRIVAL MEASUREMENTS AT A RE-CONFIGURABLE REPEATER DEVICE

(71) Applicant: Sony Group Corporation, Tokyo (JP)

(72) Inventors: Jose Flordelis, Lund (SE); Erik Bengtsson, Eslöv (SE); Fredrik Rusek, Eslöv (SE); Olof Zander, Södra Sandby (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 389 days.

(21) Appl. No.: 18/028,033

(22) PCT Filed: Oct. 8, 2021

(86) PCT No.: PCT/EP2021/077862
§ 371 (c)(1),
(2) Date: Mar. 23, 2023

(87) PCT Pub. No.: WO2022/074194
PCT Pub. Date: Apr. 14, 2022

(65) Prior Publication Data
US 2023/0344507 A1  Oct. 26, 2023

(30) Foreign Application Priority Data
Oct. 8, 2020 (SE) .................... 2030304-6

(51) Int. Cl.
*H04B 7/155* (2006.01)

(52) U.S. Cl.
CPC .............................. *H04B 7/15528* (2013.01)

(58) Field of Classification Search
CPC ...... H04B 7/15; H04B 7/155; H04B 7/15507; H04B 7/15521; H04B 7/15557; H04B 7/15592; H04B 7/165; H04B 7/15542
See application file for complete search history.

(56) References Cited

U.S. PATENT DOCUMENTS

| | | | |
|---|---|---|---|
| 2008/0225931 A1* | 9/2008 | Proctor | H04B 7/15585 455/24 |
| 2015/0350924 A1 | 12/2015 | Schmidt | |
| 2019/0174337 A1 | 6/2019 | Prasad | |
| 2019/0335430 A1 | 10/2019 | Ljung | |

OTHER PUBLICATIONS

International Search Report and Written Opinion from corresponding International Application No. PCT/EP2021/077862, mailed on Jan. 24, 2022; 16 pages.
Office Action and Swedish Search Report from corresponding Swedish Application No. 2030304-6; mailed on May 28, 2021; 6 pages.

(Continued)

*Primary Examiner* — Keith Ferguson
(74) *Attorney, Agent, or Firm* — Tucker Ellis LLP

(57) ABSTRACT

An access node—e.g., a base station—provide a wireless communication device with a configuration of a reference-signal transmission in response to a need to facilitate angle-of-arrival measurements a reconfigurable repeater device.

17 Claims, 7 Drawing Sheets

(56) References Cited

OTHER PUBLICATIONS

Zhang et al.: "Positioning with Dual Reconfigurable Intelligent Surfaces in Millimeter-Wave MIMO Systems"; International Conference on Communications in China; dated 2020; 6 pages.

Jian et al.: "A Modified Off-grid SBL Channel Estimation and Transmission Strategy for RIS-Assisted Wireless Communication Systems"; IEEE, dated 2020, 6 pages.

Wang et al.: "Joint Beam Training and Positioning for Intelligent Reflecting Surfaces Assisted Millimeter Wave Communications"; IEEE; dated Sep. 8, 2020; 15 pages.

Yang et al.: "Intelligent Reflecting Surface Meets OFDM: Protocol Design and Rate Maximization"; IEEE, dated Nov. 22, 2019; 32 pages.

\* cited by examiner

CONFIGURATION OF A WIRELESS COMMUNICATION DEVICE TO FACILITATE ANGLE-OF-ARRIVAL MEASUREMENTS AT A RE-CONFIGURABLE REPEATER DEVICE

TECHNICAL FIELD

Various examples generally relate to communicating between nodes using re-configurable repeater devices. Various examples specifically relate to repeatedly transmitting reference signals towards the re-configurable repeater devices.

BACKGROUND

In order to increase a coverage area for wireless communication, it is envisioned to use re-configurable repeater devices (RRD).

A first kind of RRD is a re-configurable repeater device, sometimes also referred to as reflecting large intelligent surface (LIS). See, e.g., Sha Hu, Fredrik Rusek, and Ove Edfors. "Beyond massive MIMO: The potential of data transmission with large intelligent surfaces." *IEEE Transactions on Signal Processing* 66.10 (2018): 2746-2758. An LIS can be implemented by an array of antennas that reflect incident electromagnetic waves/signals. The array of antennas can be semi-passive. Semi-passive can correspond to a scenario in which the antennas do not provide signal amplification, but can impose a variable amplitude and/or phase shift. An input spatial direction from which incident signals on a data carrier are accepted and an output spatial direction into which the incident signals are reflected can be re-configured, by changing a phase relationship between the antennas.

A second kind of RRD is a so-called smart repeater having an amplify-and-forward functionality. Amplify-and-forward functionality is different to a decode-and-forward functionality in that it is not required to translate RF signals into the baseband and decode. This simplifies the hardware design of smart repeaters if compared to decode-and-forward relays. On the other hand, noise superimposed on the signal is also amplified and for-warded.

It is helpful to accurately configure the spatial filter at the RRD, to provide a reliable for-warding of incident signals.

SUMMARY

Accordingly, there is need of improved techniques for re-configuring RRDs.

This need is met by the features of the independent claims. The features of the dependent claims define examples.

A method of operating an access node of a communications network is provided. The access node communicates with a UE via an RRD. The RRD is re-configurable to provide multiple spatial filters. Each one of the multiple spatial filters is associated with a respective input spatial direction from which incident signals on a data carrier are accepted. Each one of the multiple spatial filters is also associated with a respective output spatial direction into which the incident signals are reflected or amplified by the RRD. The method includes providing a configuration of a RS transmission to the UE. This is in response to a need to facilitate an angle-of-arrival measurement at the RRD based on RSs transmitted by the UE. The RS transmission includes the RS. The RS transmission is on an auxiliary carrier that is different from the data carrier.

A computer program or a computer-program product or a computer-readable storage medium includes program code. The program code can be loaded and executed by least one processor. Upon loading and executing the program code, the at least one processor performs a method of operating an access node of a communications network. The access node communicates with a UE via an RRD. The RRD is re-configurable to provide multiple spatial filters. Each one of the multiple spatial filters is associated with a respective input spatial direction from which incident signals on a data carrier are accepted. Each one of the multiple spatial filters is also associated with a respective output spatial direction into which the incident signals are reflected or amplified by the RRD. The method includes providing a configuration of a RS transmission to the UE. This is in response to a need to facilitate an angle-of-arrival measurement at the RRD based on RSs transmitted by the UE. The RS transmission includes the RS. The RS transmission is on an auxiliary carrier that is different from the data carrier.

An access node of a communications network is provided. The access node is configured to communicate with a wireless communication device via a re-configurable repeater device, RRD, the RRD being re-configurable to provide multiple spatial filters, each one of the multiple spatial filters being associated with a respective input spatial direction from which incident signals on a data carrier are accepted and with a respective output spatial direction into which incident signals are reflected or amplified by the RRD. The access node includes control circuitry configured to, in response to a need to facilitate an angle-of-arrival measurement at the RRD based on reference signals transmitted by the wireless communication device, provide, to the wireless communication device, a configuration of a reference-signal transmission comprising the reference signals, the reference-signal transmission being on an auxiliary carrier different from the data carrier.

A method of operating a wireless communication device connectable to a communications network is provided. The wireless communication device communicates with an access node of the communications network via a re-configurable repeater device, RRD. The RRD is re-configurable to provide multiple spatial filters, each one of the multiple spatial filters being associated with a respective input spatial direction from which incident signals on a data carrier are accepted and with a respective output spatial direction into which incident signals are reflected or amplified by the RRD. The method includes obtaining, from the access node, a configuration of a reference-signal transmission. The method also includes transmitting reference signals of the reference-signal transmission to the RRD in accordance with the configuration, to facilitate an angle-of-arrival measurement at the RRD.

A computer program or a computer-program product or a computer-readable storage medium includes program code. The program code can be loaded and executed by least one processor. Upon loading and executing the program code, the at least one processor performs a method of operating a wireless communication device connectable to a communications network. The wireless communication device communicates with an access node of the communications network via a re-configurable repeater device, RRD. The RRD is re-configurable to provide multiple spatial filters, each one of the multiple spatial filters being associated with a respective input spatial direction from which incident signals on a data carrier are accepted and with a respective output spatial direction into which incident signals are reflected or amplified by the RRD. The method includes obtaining, from the access node, a configuration of a reference-signal transmission. The method also includes transmitting reference signals of the reference-signal transmission to the RRD in accordance with the configuration, to facilitate an angle-of-arrival measurement at the RRD.

A wireless communication device connectable to a communications network is provided. The wireless communication device is configured to communicate with an access node of the communications network via a re-configurable repeater device, RRD. The RRD is re-configurable to provide multiple spatial filters, each one of the multiple spatial filters being associated with a respective input spatial direction from which incident signals on a data carrier are accepted and with a respective output spatial direction into which incident signals are reflected or amplified by the RRD. The wireless communication device comprises control circuitry configured to obtain, from the access node, a configuration of a reference-signal transmission (800); and transmit reference signals (5050) of the reference-signal transmission (800) to the RRD in accordance with the configuration, to facilitate an angle-of-arrival measurement at the RRD.

A method of operating a re-configurable repeater device, RRD, is provided. The RRD is re-configurable to provide multiple spatial filters, each one of the multiple spatial filters being associated with a respective input spatial direction from which incident signals on a data carrier are acceptable and with a respective output spatial direction into which incident signals are reflected or amplified by the RRD. The method includes obtaining at least a part of a configuration of a reference-signal transmission by a wireless communication device. The method further includes monitoring for reference signals of the reference-signal transmission based on the at least a part of the configuration. The method further includes determining an angle-of-arrival of the reference signals based on said monitoring. The method further includes re-configuring to provide a selected spatial filter of the multiple spatial filters based on the angle-of-arrival.

A computer program or a computer-program product or a computer-readable storage medium includes program code. The program code can be loaded and executed by least one processor. Upon loading and executing the program code, the at least one processor performs a method of operating a re-configurable repeater device, RRD. The RRD is re-configurable to provide multiple spatial filters, each one of the multiple spatial filters being associated with a respective input spatial direction from which incident signals on a data carrier are acceptable and with a respective output spatial direction into which incident signals are reflected or amplified by the RRD. The method includes obtaining at least a part of a configuration of a reference-signal transmission by a wireless communication device. The method further includes monitoring for reference signals of the reference-signal transmission based on the at least a part of the configuration. The method further includes determining an angle-of-arrival of the reference signals based on said monitoring. The method further includes re-configuring to provide a selected spatial filter of the multiple spatial filters based on the angle-of-arrival.

A re-configurable repeater device, RRD is provided. The RRD is re-configurable to provide multiple spatial filters, each one of the multiple spatial filters being associated with a respective input spatial direction from which incident signals on a data carrier are acceptable and with a respective output spatial direction into which incident signals are reflected or amplified by the RRD. The RRD comprises a control circuitry configured to obtain at least a part of a configuration of a reference-signal transmission by a wireless communication device; and monitor for reference signals of the reference-signal transmission based on the at least a part of the configuration; and determine an angle-of-arrival of the reference signals based on said monitoring; and re-configure to provide a selected spatial filter of the multiple spatial filters based on the angle-of-arrival.

It is to be understood that the features mentioned above and those yet to be explained below may be used not only in the respective combinations indicated, but also in other combinations or in isolation without departing from the scope of the invention.

DETAILED DESCRIPTION OF THE DRAWINGS

Figure 1:
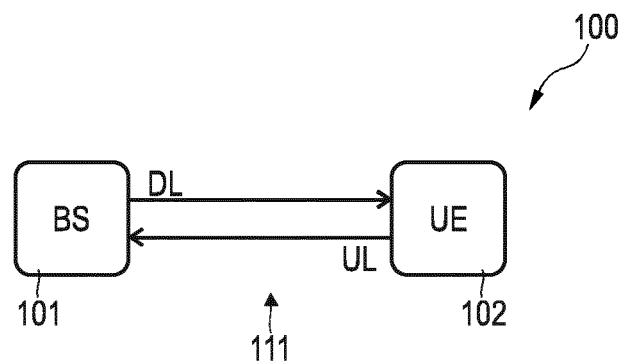
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. The nodes communicate on a data carrier. In some examples, the wireless communication system can be implemented by a wireless communication network, e.g., a radio-access network (RAN) of a Third Generation Partnership Project (3GPP)-specified cellular network (NW). In such case, the transmitter node can be implemented by an access node such as a base station (BS) of the RAN, and the one or more receiver nodes can be implemented by wireless communication devices (also referred to as user equipment, UE). It would also be possible that the transmitter node is implemented by a UE and the one or more receiver nodes are implemented by a BS and/or further UEs. Hereinafter, for sake of simplicity, various examples will be described with respect to an example implementation of the transmitter node by a BS and the one or more receiver nodes by UEs—i.e., to downlink (DL) communication; but the respective techniques can be applied to other scenarios, e.g., uplink (UL) communication and/or sidelink communication.

According to various examples, it is possible to use multi-antenna techniques. Multi-antenna techniques are sometimes used to enhance reliability and/or throughput of wireless communication. Here, the transmitter node and the receiver node both include multiple antennas that can be operated in a phase-coherent manner. Thereby, a signal can be transmitted redundantly (diversity multi-antenna mode) along multiple spatial data streams, or multiple signals can be transmitted on multiple spatial data streams (spatial multiplexing multi-antenna operational mode). It is possible to use beamforming: here, spatial data streams can be defined by focusing the transmission energy for transmitting (transmit beam, TX beam) and/or the receive sensitivity for receiving (receive beam, RX beam) to a particular spatial direction. For beamforming, the process of identifying the appropriate beams is often referred to beam management. Various techniques described herein are concerned with beam management. According to various examples, the transmitter node can communicate with at least one of the receiver nodes via an RRD. The RRD may include an antenna array. The RRD may include a meta-material surface. In examples, an RRD may include a reflective antenna array (RAA). The RRD can implement a smart repeater functionality using amplify-and-forward. To forward an incident signal, the RRD may not decode the signal. The RRD may not translate an incident signal into the baseband. As a general rule, the RRD is configured to employ multi-antenna techniques. In particular, the RRD is reconfigurable to provide multiple spatial filters. Thereby, a spatial data stream between two nodes—e.g., the BS and the UE—can be diverted. Each one of the multiple spatial filters is associated with a respective input spatial direction from which incident signals on a respective data radio carrier are accepted, as well as with a respective output spatial direction into which incident signals are reflected or amplified by the RRD. Each output spatial direction is associated with a respective beam. The RRD thereby implements beamforming.

There are many schools of thought for how RRDs should be integrated into 3GPP-standardized RANs. In an exemplary case, the NW operator has deployed the RRDs and is therefore in full control of the RRD operations. The UEs, on the other hand, may not be aware of the presence of any RRD, at least initially, i.e., it is transparent to a UE whether it communicates directly with the BS or via an RRD. The RRD essentially functions as a coverage-extender of the BS. The BS may have established a control link with the RRD. According to another exemplary case, it might be a private user or some public entity that deploys the RRD. Further, it may be that the UE, in this case, controls RRD operations. The BS, on the other hand, may not be aware of the presence of any RRD and, moreover, may not have control over it/them whatsoever. The UE may gain awareness of the presence of RRD by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the RRD. The control link can thus be on an auxiliary carrier.

In a further exemplary case, neither the UE nor the BS are aware of the presence of the RRD. The RRD may be transparent with respect to a communication between the UE and the BS on a data carrier. The RRD may gain awareness of the UE and/or the BS and re-configure itself based on information obtained from the UE and/or BS.

The three exemplary cases described above are summarized in TAB. 1 below.

TABLE 1

Scenarios for RRD integration into cellular NW

| Scenario | Description | Explanation |
| --- | --- | --- |
| A | BS-RRD control link | BS controls the RRD and/or can obtain information from the RRD. A control link is established between the BS and the RRD. The control link can be on an auxiliary carrier different from the data carrier. The control link can be a wired connection, e.g., cable or fiber. |
| B | UE-RRD control link | UE controls the RRD and/or can obtain information from the RRD. A control link is established between the UE and the RRD. The control link can be on an auxiliary carrier different from the data carrier |
| C | Transparent RRD | RRD re-configures itself based on information obtained from the UE and/or BS. No control link is established between the RRD and the UE or the BS. |

According to various examples, it is possible to implement a scenario A according to TAB. 1. It is optionally possible to alternatively or additionally implement the UE RRD control link according to scenario B. In any case, the RRD can be fully controlled by the BS.

Various techniques are based on the finding that, in order to reflect an incident signal towards the UE, the RRD requires knowledge regarding the direction and potentially distance at which the UE is positioned relatively to the RRD.

The techniques described herein can be used to facilitate a reference-signal transmission of reference signals (RSs;

sometimes also referred to as pilot signals or synchronization signals or beacon signals) transmitted by a first node, e.g., the UE. The UE can transmit the RS in a broadcast or point-to-point manner. The RSs can have a predefined signal shape and/or symbol sequence. The RSs can have predefined transmit properties such as, e.g., transmit amplitude or phase, or even precoding. Thus, by using the RSs, one or more second nodes, e.g., the RRD, can obtain information on the channel between the first node and the respective one of the one or more second nodes. As a general rule, various kinds and types of RSs can be subject to the techniques described herein. For instance, RSs that are not associated with one or more specific UE's—e.g., a primary synchronization signal (PSS) or a secondary synchronization signal (SSS) broadcasted in a synchronization signal block (SSB)—can be subject to the techniques described herein. Further examples include sounding RSs and positioning RSs. Alternatively or additionally, it would be possible to apply the techniques described herein to RSs that are associated with one or more specific UEs; an example would be a Channel State Information (CSI)-RS.

To determine the direction at which the UE is positioned relative to the RRD—e.g., for the purpose of beam management at the RRD and/or the UE—, it is possible to implement a positioning procedure between the RRD and the UE. As a general rule, various options are available for implementing the positioning procedure. In particular, an RS-based positioning procedure is possible. Here, the UE transmits RSs and the RRD can monitor for the RSs. Then, the RRD, based on one or more receive properties of the RSs, can determine one or more characteristics of its relative position with respect to the UE. For example, the RRD could determine the angle-of-arrival (AoA) of the RSs of the RS transmission; the AoA then corresponds to the direction of a spatial propagation path of signals between the UE and the RRD. It would also be possible to determine the path loss to conclude on the length of the spatial propagation path. Another characteristic of the relative position would be distance. For instance, it would be possible to conclude on the distance between the UE and the RRD based on a path loss experienced by the RSs of the reference-signal transmission; the path loss can be determined based on comparing a transmit amplitude of the RSs with a receive amplitude of the RSs. Another possibility to estimate the length of the spatial propagation path would be to measure the delay of signals propagating. Another option for positioning measurements includes angle-of-departure measurements at the UE, e.g., based on feedback from the RRD to the UE. It is not required in all scenarios that the relative position is determined based on one or more receive properties of the RS. In some examples, the RS may also encode the position of the UE and then the RRD can decode the respective digital information and compare the position of the UE with its own position; this helps to determine the AoA.

As explained above, the RRD does not include the capability to demodulate RF signals to thereby facilitate baseband processing. Accordingly, in the various examples described herein, it is possible that the RRD is equipped with a receiver for an auxiliary carrier that is different to the data carrier on which the RRD facilitates the communication between the transmitter node and the receiver node. Then, the RS transmission can be implemented on the auxiliary carrier. In other words, based on the receiver for the auxiliary carrier, the RRD can implement digital signal processing of digital signals determined based on the RSs; the RRD may not have such capability for similar digital signal processing associated with transmissions on the data carrier.

For example, the data carrier and the auxiliary carrier may reside in different frequency bands. To give an example, it would be possible that the data carrier has frequencies above 20 GHz while the auxiliary carrier has frequencies below 10 GHz, e.g., below 6 GHz. For example, typical frequencies can be in the range of 2.6 to 2.7 GHz. Accordingly, the auxiliary carrier and the data carrier can employ different carriers. A modulation and/or coding scheme can be different for the data carrier and the auxiliary carrier. A communication protocol implemented on the data carrier can be different from a further communication protocol implemented on the auxiliary carrier. For example, the data carrier can employ a 3GPP cellular communication; while the auxiliary carrier employs a Bluetooth or Wi-Fi communication protocol.

According to various examples, it is possible that the BS is in control of AoA measurements at the RRD. Accordingly, the BS can orchestrate an interaction between the UE and the RRD for the purpose of implementing the AoA measurements. This has the effect that, e.g., by considering ongoing AoA measurements when scheduling communication between other nodes, the BS can mitigate interference. Furthermore, control signaling overhead on the spectrum of, both, the auxiliary carrier, as well as the data carrier can be reduced by the controlled configuration of the RS transmission. It is possible to implement scenario A of TAB. 1.

Accordingly, according to various examples, the BS provides a configuration of the RS transmission to the UE. The BS may provide the configuration of the RS transmission for the purpose of facilitating the AoA measurements at the RRD. Accordingly, the BS can provide the configuration of the RS transmission in response to a need to facilitate the AoA measurement at the RRD based on the RSs of the RS transmission and as transmitted by the UE. The UE can then obtain the configuration of the RS transmission from the BS and subsequently transmit the RSs of the RS transmission to the RRD in accordance with the configuration. Thereby, the UE can facilitate the AoA measurement at the RRD. The RRD can monitor for the RSs of the RS transmission and then determine an AoA, e.g., based on one or more receive properties of the RSs, e.g., amplitude and/or phase. Such monitoring can be based on at least a part of the configuration provided to the UE also being provided to the RRD, from the BS. Then, the RRD can implement a reconfiguration to provide a selected spatial filter of multiple available spatial filters based on the determined AoA.

FIG. 1 schematically illustrates a communication system 100. The communication system includes two nodes 101, 102 that are configured to communicate with each other via a data carrier 111. In the example of FIG. 1, the node 101 is implemented by an access node, more specifically a BS, and the node 102 is implemented by a UE. The BS 101 can be part of a cellular NW (not shown in FIG. 1).

As a general rule, the techniques described herein could be used for various types of communication systems, e.g., also for peer-to-peer communication, etc. For sake of simplicity, however, hereinafter, various techniques will be described in the context of a communication system that is implemented by a BS 101 of a cellular NW and a UE 102.

As illustrated in FIG. 1, there can be DL communication, as well as UL communication. Various examples described herein particularly focus on the DL communication of RSs that are repeatedly transmitted by the BS 101 to the UE 102. However, similar techniques may be applied to, e.g., UL communication of RSs repeatedly transmitted by the UE 102 to the BS 101.

The UE 102 and the BS 101 can communicate on the data carrier 111. For instance, the data carrier 111 may have a carrier frequency of not less than 20 GHz or even not less than 40 GHz. The data carrier 111 may be via an RRD (not illustrated in FIG. 1).

Figure 2:
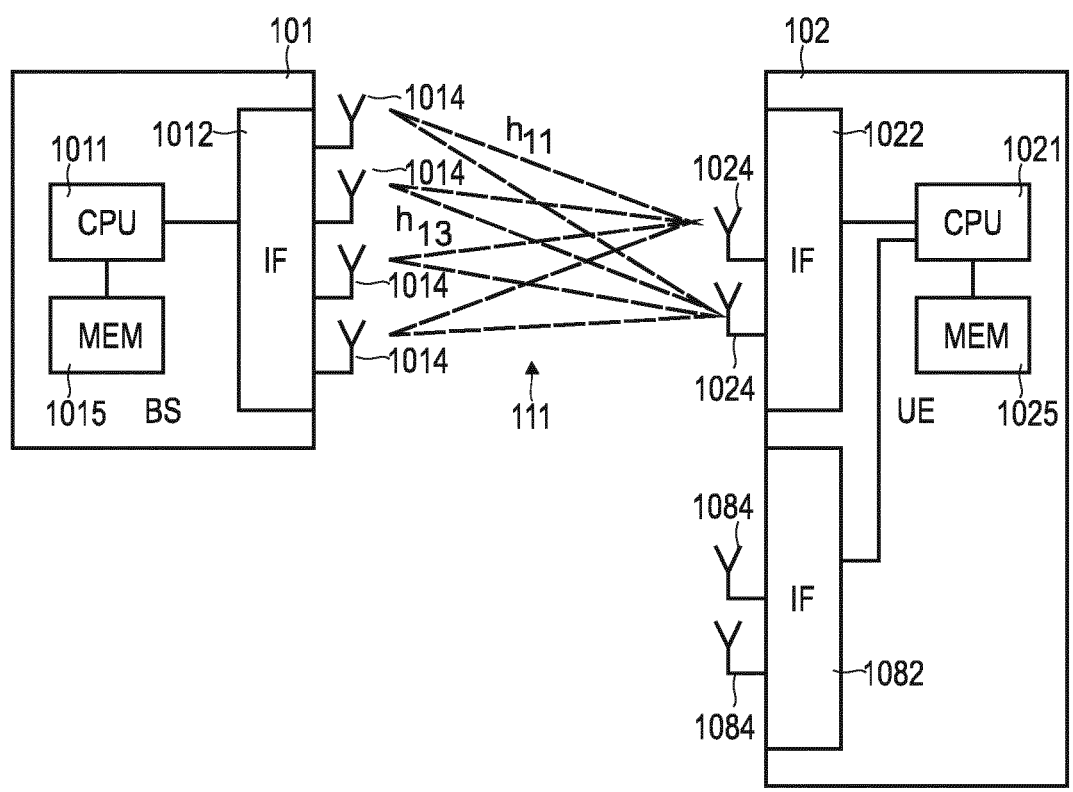
FIG. 2 schematically illustrates details of the communication system of FIG. 1.

FIG. 2 illustrates details with respect to the BS 101. The BS 101 implements an access node to a communications network, e.g., a 3GPP-specified cellular network. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: providing a configuration of an RS transmission to the UE 102; providing at least a part of the configuration of the RS transmission to a RRD (not illustrated in FIG. 2); scheduling communication on the data carrier 111 in accordance with a report on the RS transmission received from the RRD; etc.

FIG. 2 also illustrates details with respect to the UE 102. The UE 102 includes control circuitry that is implemented by a processor 1021 and a non-volatile memory 1025. The processor 1021 can load program code that is stored in the memory 1025. The processor can execute the program code. Executing the program code causes the processor to perform techniques as described herein, e.g.: obtaining a configuration of an RS transmission from the BS 101; transmitting RSs of the RS transmission in accordance with the configuration; communicating with the BS 101 on the data carrier 111; etc.

FIG. 2 also illustrates details with respect to communication between the BS 101 and the UE 102 on the data carrier 111. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the BS.

The interfaces 1012, 1022 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 1014, 1024. Thereby, the BS 101 and the UE 102 can selectively transmit on multiple TX beams (beamforming), to thereby direct energy into distinct spatial directions.

By using a TX beam, the direction of signals transmitted by a transmitter of the communication system is controlled. Energy is focused into a respective direction or even multiple directions, by phase-coherent superposition of the individual signals originating from each antenna 1014, 1024. Thereby, the spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

As illustrated in FIG. 2, the UE 102 also includes an auxiliary interface 1082 that is configured to couple with a plurality of antennas 1084. Using the auxiliary interface 1082, the UE 102 can communicate on an auxiliary carrier.

As a general rule, at least in some scenarios, it would be possible that for communicating on the auxiliary carrier, the UE 102 can re-use the interface 1022 also used to communicate on the data carrier 111; in such a scenario it is not required that the UE 102 includes the additional auxiliary interface 1082.

Figure 3:
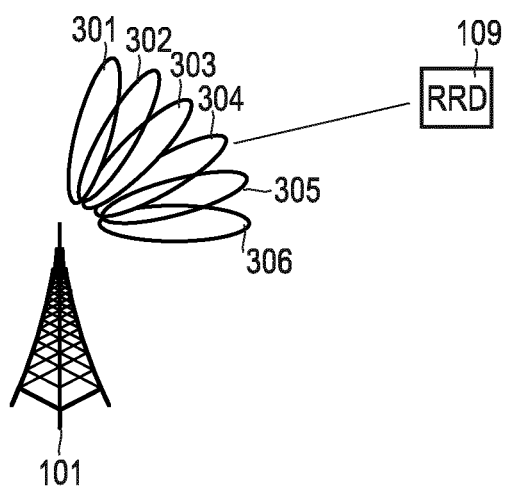
FIG. 3 schematically illustrates using an RRD according to various examples.

FIG. 3 illustrates DL TX beams 301-306 used by the BS 101. Here, the BS 101 activates the beams 301-306 on different resources (e.g., different time-frequency resources, and/or using orthogonal codes/precoding) such that the UE 102 can monitor for respective signals transmitted on the DL TX beams 301-306.

A burst transmission transmits RSs or other signals on at least some of the DL TX beams 301-306. To this end, the burst transmission includes multiple transmission blocks, wherein each transmission block is associated with a respective DL TX beam 301-306. An example would be an SSB burst including multiple SSBs, each SSB including a PSS and SSS, wherein different SSBs are transmitted on different ones of the DL TX beams 301-306.

It is possible that the BS 101 transmits signals to the UE 102 via an RRD 109. In the scenario of FIG. 3, the downlink transmit beam 304 is directed towards the RRD 109. Thus, whenever the BS 101 transmits signals to the UE 102 using the downlink transmit beam 304—e.g., a respective block of a burst transmission —, a spatial filter is provided by the RRD 109. The spatial filter is associated with a respective spatial direction and to which the incident signals are then selectively reflected by the RRD 109. Details with respect to the RRD 109 are illustrated in connection with FIG. 4.

Figure 4:
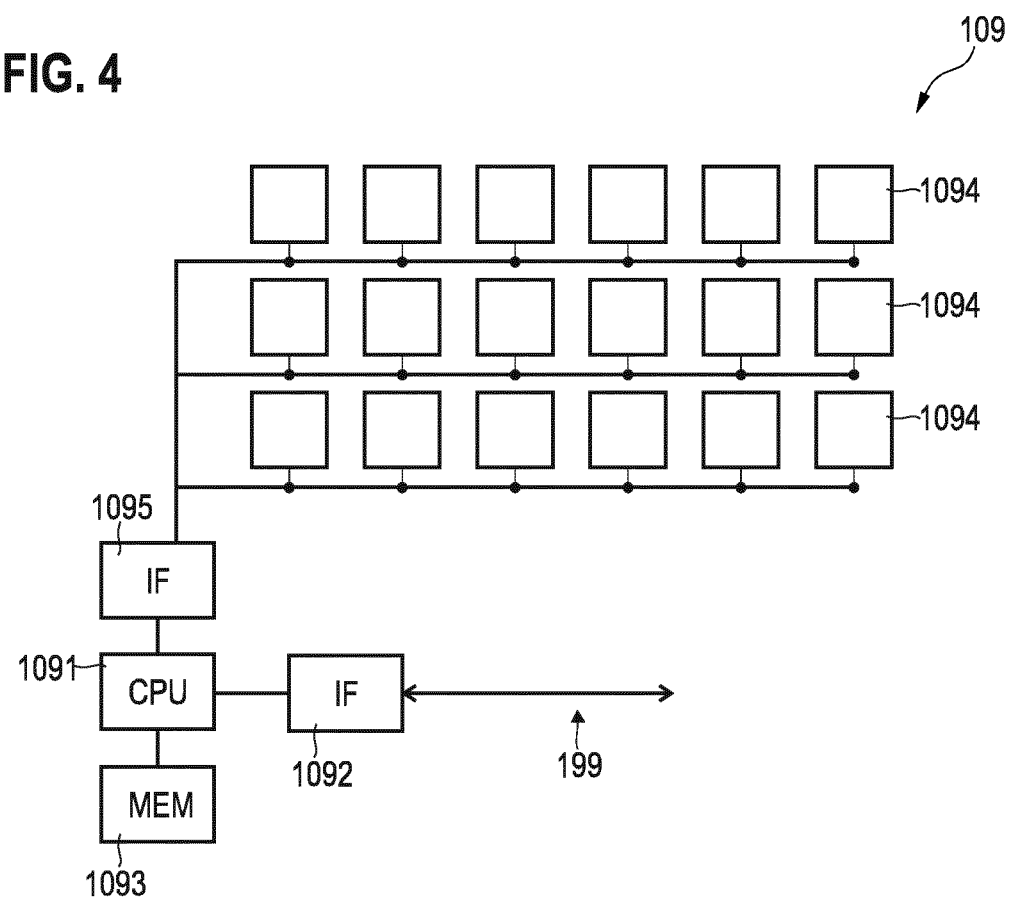
FIG. 4 schematically illustrates details with respective to the RRD.

FIG. 4 illustrates aspects in connection with the RRD 109. The RRD 109 could be implemented by a LIS or a smart repeater. The RRD 109 includes a phased array of antennas 1094 that impose a configurable phase shift when reflecting incident signals. This defines respective spatial filters that are associated with spatial directions into which the incident signals are reflected. In one example, the antennas 1094 can be passive or semi-passive elements that do not provide any amplification. The RRD 109 thus provides coverage extension by reflection of radio-frequency (RF) signals. Another example includes amplification of RF signals. In any case, a translation to the baseband may not be required. This is different, to, e.g., decode-and-forward relay functionality. In particular, a delay imposed by decode-an-forward relay functionality significantly larger than a delay imposed by an amplifier-and-forward repeater functionality. For instance, the delay imposed by the amplifier-an-forward functionality may be in the order of a symbol dura-tion of the used modulation scheme, or less.

The RRD 109 includes an antenna interface 1095; a processor 1091 can activate respective spatial filters one after another, e.g., in accordance with a re-configuration timing that defines the dwell time per spatial filter.

There is a communication interface 1092 and communication on an auxiliary carrier 199 can be established between the RRD 109 and, e.g., the BS 101 and/or the UE 102 (cf. TAB. 1: scenario A or B).

There is a memory 1093 and the processor 1091 can load program code from the non-volatile memory and execute the program code. Executing the program code causes the processor to perform techniques as described herein, e.g.: receiving at least a part of a configuration of a RS transmission to be carried out by the UE 102; monitoring for RSs of the RS transmission in according with the at least part of the configuration; executing a positioning of the RRD 109 with respect to the UE 102 based on said monitoring; measuring an AoA of the RSs based on said monitoring;

selecting one or more spatial filters based on said monitoring; reconfiguring to implement the selected one or more spatial filters; etc.

FIG. 4 is only one example implementation of the RRD. Other implementations are conceivable. For example, a meta-material surface not including distinct antenna elements may be used. The meta-material can have a configurable refraction index. To provide re-configurable refraction index, the meta-material may be made of repetitive tunable structures that have extensions smaller than the wavelength of the incident RF signals. A typical patch antenna has dimensions of half a wavelength. A monopole antenna has dimensions of a quarter of the wavelength.

Figure 5:
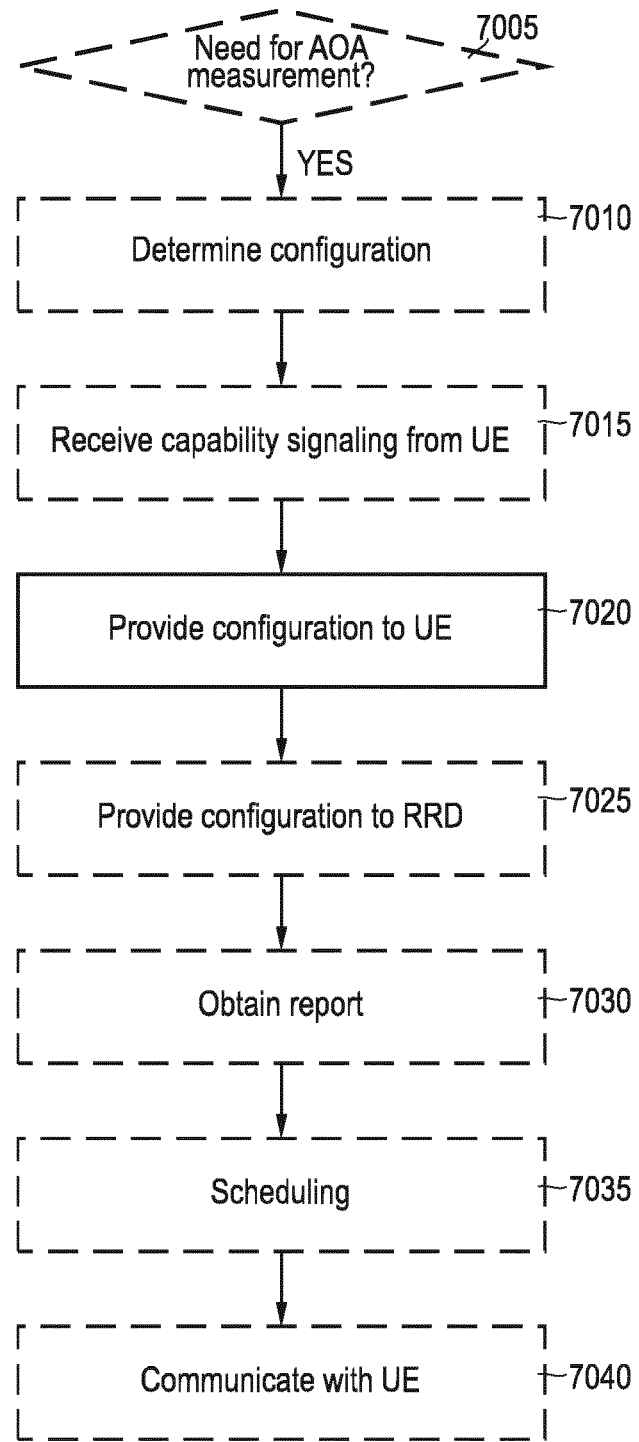
FIG. 5 is a flowchart of a method according to various examples.

FIG. 5 is a flowchart of a method according to various examples. For instance, the method of FIG. 5 can be executed by an access node of a communications network, e.g., the BS 101. More specifically, the method of FIG. 5 could be executed by the processor 1011 upon loading program code from the memory 1015 (cf. FIG. 2). Optional boxes are labeled with dashed lines in FIG. 5.

At optional box 7005, the BS 101 determines whether there is a need to facilitate an AoA measurement at the RRD 109. Various examples are available to determine whether there is such a need. For example, the BS 101 could receive a corresponding indication from the RRD on a respective control link established between the BS and the RRD, cf. TAB. 1, example A. To give an example, the RRD 109 may detect that it does not receive RSs from the UE 102 and then trigger a respective request for a new or adjusted RS transmission. Alternatively or additionally to such control signaling from the RRD 109, the BS 101 may also determine the need to facilitate the AoA measurement based on control signaling from the UE 102. For example, it would be possible that the control signaling is indicative of a connection termination of a communication connection established between the UE 102 and the RRD 109 using the auxiliary carrier 199. For instance, it would be conceivable that such a communication connection is implemented for the purpose of transmitting RSs, e.g., Bluetooth beacons or Wi-Fi beacons, from the UE 102 to the RRD 109. Then, e.g., due to UE mobility, it would be possible that the communication connection is lost and the UE 102 may provide a respective indication to the BS 101; such an indication may also be provided by the RRD 109.

It is not required in all scenarios that the need for the AoA measurement is determined, at box 7005, based on control signaling from the RRD 109 and/or the UE 102. For instance, it would be possible that the BS 101 detects that it communicates on the data carrier 111 with the UE 102 via the RRD 109. Based on such detection, the BS 101 can then determine that there is a need for the AoA measurements. In general, the RRD can measure the power of a beacon, report it to BS, and judge the proximity.

At optional box 7010, the BS 101 may determine the configuration of the RS transmission. The configuration may be re-determined from time to time, e.g., in accordance with a repetitive schedule. For example, it would be possible to determine the configuration dynamically, i.e., depending on one or more dynamic properties of, e.g., the data carrier 111. For instance, for poor transmission characteristics of the data carrier 111 a higher density of RSs of the RS transmission may be preferable. The transmission characteristics of the data carrier 111 may be determined based on RSs communicated from the UE 102 to the BS 101 or from the BS 101 to the UE 102 on the data carrier 111. Channel sounding is in general known to the skilled person and can be applied also to the discussed scenario; i.e., the configuration may be determined based on channel sounding of the data carrier 111.

It is not required in all scenarios that the configuration of the RS transmission is determined at box 7010; for instance, in some scenarios it would be possible that the configuration is predefined.

Next, at optional box 7015, the BS 101 provides the configuration of the RS transmission to the UE 102, to thereby facilitate the AoA measurement at the RRD 109.

As a general rule, various options are available for implementing the configuration and some of these options are listed below in TAB. 2.

TABLE 2 multiple variants of implementing the configuration. It is possible to combine such variants with each other to form new variants. For instance, it would be possible to signal, both, the transmit power, as well as the repetitive resources according to variants V and VI, to give just one example.

| Variant | Brief description | Examples |
|---|---|---|
| I | Identifier of RRD | It would be possible that the configuration includes one or more identifiers that are to be indicated by the RSs of the RS transmission. In particular, the identifiers could be associated with the RRDs; i.e., different identifiers may be associated with different RRDs. Each identifier may be uniquely associated with a respective RRD. Different UEs being served via the same RRD can use the same RRD-specific identifier. Thereby, a certain RRD can judge, based on the received RS, whether the respective RS is intended for that repeater device or for another RRD. |
| II | Identifier of UE | It would be possible that the configuration includes one or more identifiers that are to be indicated by the RSs of the RS transmission. In particular, the identifiers could be associated with the respective UE; i.e., different identifiers may be associated with different UEs. Thus, different UEs may be provided with different UE-specific identifiers. Each identifier may be uniquely associated with a respective UE. It would be possible that each RRD is configured with one or more respective UE-specific identifiers, e.g., by providing a respective part of the configuration to the |

TABLE 2-continued multiple variants of implementing the configuration. It is possible to combine such variants with each other to form new variants. For instance, it would be possible to signal, both, the transmit power, as well as the repetitive resources according to variants V and VI, to give just one example.

| Variant | Brief description | Examples |
|---|---|---|
| | | RRD (cf FIG. 5: box 7025). Thereby, multiple UEs can be supported by each RRD. |
| III | Identifiers shared between multiple communication devices | As an alternative to variant II explained above, it would be possible that the identifiers are contention-based amongst a plurality of UEs served by a given RRD. I.e., it would be possible that a range of possible identifiers is broadcasted or predefined that can be used by the UEs and that the UEs select a respective identifier from the range. It can happen that two UEs select the same identifier and then contention can occur. In such a scenario, it would be possible that the configuration of the RS transmission is indicative of a set of candidate identifiers for which each individual UE can select a concrete identifier in a respective instance of transmitting RSs. This can help to mitigate contention to some degree. |
| IV | Identifiers of polarization of RSs | RSs of the RS transmission may be transmitted with one or multiple polarizations. For instance, perpendicular polarizations may be used. Here, it would be possible that the configuration includes a first configuration for the first polarization of the RSs of the RS transmission and a second configuration for a second polarization of the RS transmission. In some examples, it would be possible to use different identifiers for the first and second polarization and the first configuration can include the first identifier of the second configuration includes the second identifier. |
| V | Transmit power | The configuration can specify a transmit power of the RSs of the RS transmission to be used by the UE. For instance, the transmit power may be tailored in view of interference on the spectrum and/or an expected distance between the UE and the RRD. |
| VI | Repetitive resources | The configuration can include repetitive resources for the RS transmission. For instance, time-frequency resources in a time-frequency resource grid used for communicating on the auxiliary carrier 199 can be used. Also, code resources could be indicated, to implement code-division multiplexing. |
| VII | Discovery information for establishing communication | The configuration can include assistance for discovery, i.e., enabling the UE and the RRD to set up a communication connection on the auxiliary carrier 199 which can host the RS transmission. Here, it is not required in all scenarios that the RS transmission is implemented on a respective communication connection; rather, in some scenarios the RSs may be transmitted without a set up communication connection; e.g., a broadcast would be possible. |
| VIII | Beam configuration | For instance, the RS transmission can include a beam sweep. Here, RSs can be transmitted on multiple beams. The count and/or width and/or orientation of the beams can be configured by the BSs. |
| IX | Multiple identifier associated with multiple polarizations of data carrier | It would be possible that multiple identifiers are transmitted for multiple polarizations of signals communicated on the data carrier. For instance, the configuration can include a first configuration for at least one first RS of the RS transmission and a second configuration for at least one second RS of the RS transmission. The at least one first RS is associated with a first polarization of signals on the data carrier and the at least one second RS is associated with a second polarization of signals on the data carrier. |

The identifiers according to variants I-III of TAB. 2 could be implemented by explicit identifiers, e.g., encoded into a base sequence or otherwise included in the RSs. Also implicit indicators would be conceivable, e.g., by selecting a specific carrier frequency, time pattern or code-division multiple access (CDMA) encoded signal.

At optional box 7015, the BS 101 receives a capability signaling from the UE. This capability signaling can be indicative of the UE 102 being capable of transmitting the RSs using the auxiliary carrier. Box 7015 may also be executed prior to box 7010 or prior to box 7005.

At box 7020, the configuration is provided to the UE 102. It would be possible that the configuration is included in a control message. For example, a higher-layer control message may be used. The higher-layer control message can be communicated on the data carrier 111 between the BS 101 and the UE 102. For example, a Layer 2 or Layer 3 con-trot message may be used. For example, a Radio Resource Control (RRC) control message may be used.

At optional box 7025, at least a part of the configuration is provided to the RRD 109. For instance, one or more parts of the configuration can be provided to the RRD that are required for the RRD to monitor for the RSs of the RS transmission. For instance, time-frequency resources may be included in the part of the configuration provided to the RRD. identifiers of relevant RSs may be included in the part of the configuration provided to the RRD (cf. TAB. 2, variants I-III).

By providing the configuration at box 7020 and optionally at box 7025, the BS 101 can facilitate the AoA measurement at the RRD based on RSs that are transmitted by the UE 102.

At optional box 7030, it would be possible that the BS 101 receives a report from the RRD. The report can be associated the RSs of the RS transmission. For instance, the report could be indicative of a receive amplitude of the RSs. Alternatively or additionally, the report could be indicative of an AoA of the RSs.

Then, at optional box 7035, it would be possible to schedule communication between the BS 101 and the UE 102 based on the report. This can be done to mitigate interference.

At box 7040, it is then possible to communicate with the UE 102, e.g., by transmitting and/or receiving data packets including payload data or higher-layer control messages on the data carrier 111. In view of the appropriate selection of a given spatial filter having taken place at the RRD based on the AoA measurement facilitated by providing the configuration to the UE 102 at box 7020, this communicating at box 7040 is particularly reliable.

Figure 6:
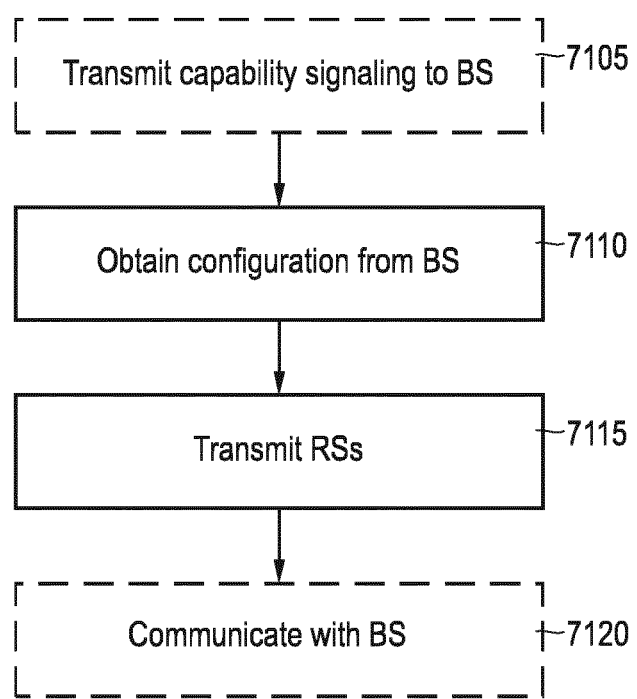
FIG. 6 is a flowchart of a method according to various examples.

FIG. 6 is a flowchart of a method according to various examples. For example, the method of FIG. 6 can be executed by a UE. The method of FIG. 6 can be executed by the UE 102. More specifically, the method of FIG. 6 can be executed by the processor 1020 of the UE 102 upon loading respective program code from the memory 1025. Optional boxes are labeled with dashed lines in FIG. 6.

At optional box 7105, the UE may transmit capability signaling to the BS 101. The capability signaling is indicative of the UE being able to transmit RSs for facilitating an AoA measurement at the RRD 109. When transmitting the capability signaling at box 7105, the UE need not to be aware of the presence of an RRD such as the RRD 109. This is because a control link may be established between the RRD 109 and the BS 101 (cf. TAB. 1: variant A), but not between the RRD 109 and the UE 102. Box 7105 is interrelated with box 7015 (cf. FIG. 5).

At box 7110, the UE 102 obtains the configuration of the RS transmission. Box 7110 is inter-related with box 7020 (cf. FIG. 5).

Then, in accordance with the configuration, the UE 102 can transmit RSs of the RS transmission at box 7115. For instance, the UE may use a transmit power included in the configuration.

For instance, the UE 102 may use time-frequency resources as indicated in the configuration. Optionally, prior to transmitting the RSs at box 7115, the UE may establish a communication connection with the RRD 109 on the auxiliary carrier 199; optionally, this may be based on respective discovery information included in the configuration.

Then, at box 7120, the UE 102 can communicate with the BS 101. Again, because the AoA measurement has been facilitated at box 7115 by transmitting the RSs of the RS transmission, the communication at box 7120 will exhibit a particularly high reliability. Box 7120 is inter-related with box 7040.

Figure 7:
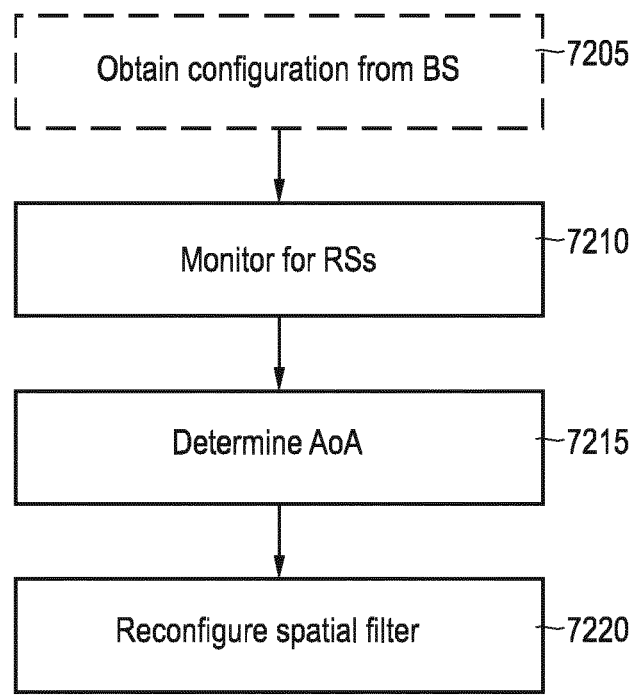
FIG. 7 is a flowchart of a method according to various examples.

FIG. 7 is a flowchart of a method according to various examples. The method of FIG. 7 can be executed by an RRD. For example, the method of FIG. 7 may be executed by the RRD 109. More specifically, the method of FIG. 7 may be executed by the processor 1091 upon loading respective program code from the memory 1093. Optional boxes are labeled with dashed lines in FIG. 7.

At optional box 7205, at least a part of a configuration of an RS transmission is obtained from the BS 101. As such, box 7205 is inter-related with box 7025 (cf. FIG. 5).

Instead of receiving at least a part of the configuration at box 7205, e.g., via a control link established between the BS 101 and the RRD 109, it would also be possible that the configuration is predefined.

Next, at box 7210, the RRD monitors for RSs, e.g., in accordance with the predefined configuration or based on the configuration received at least in parts at box 7205.

Based on said monitoring for the RSs, the RRD can then determine the AoA of the RSs and, accordingly reconfigure its spatial filtering at box 7220. This can correspond to beam management at the RRD. Subsequently, it can support a communication between the BS 101 and the UE 102 using the reconfigured spatial filter (cf. FIG. 5: box 7040, as well as FIG. 6, box 7120).

The RRD may optionally inform the UE 102 regarding a suitable TX and/or RX beam to be used at the UE 102. A respective feedback signaling from the RRD 109 to the UE 102 would be possible.

Figure 8:
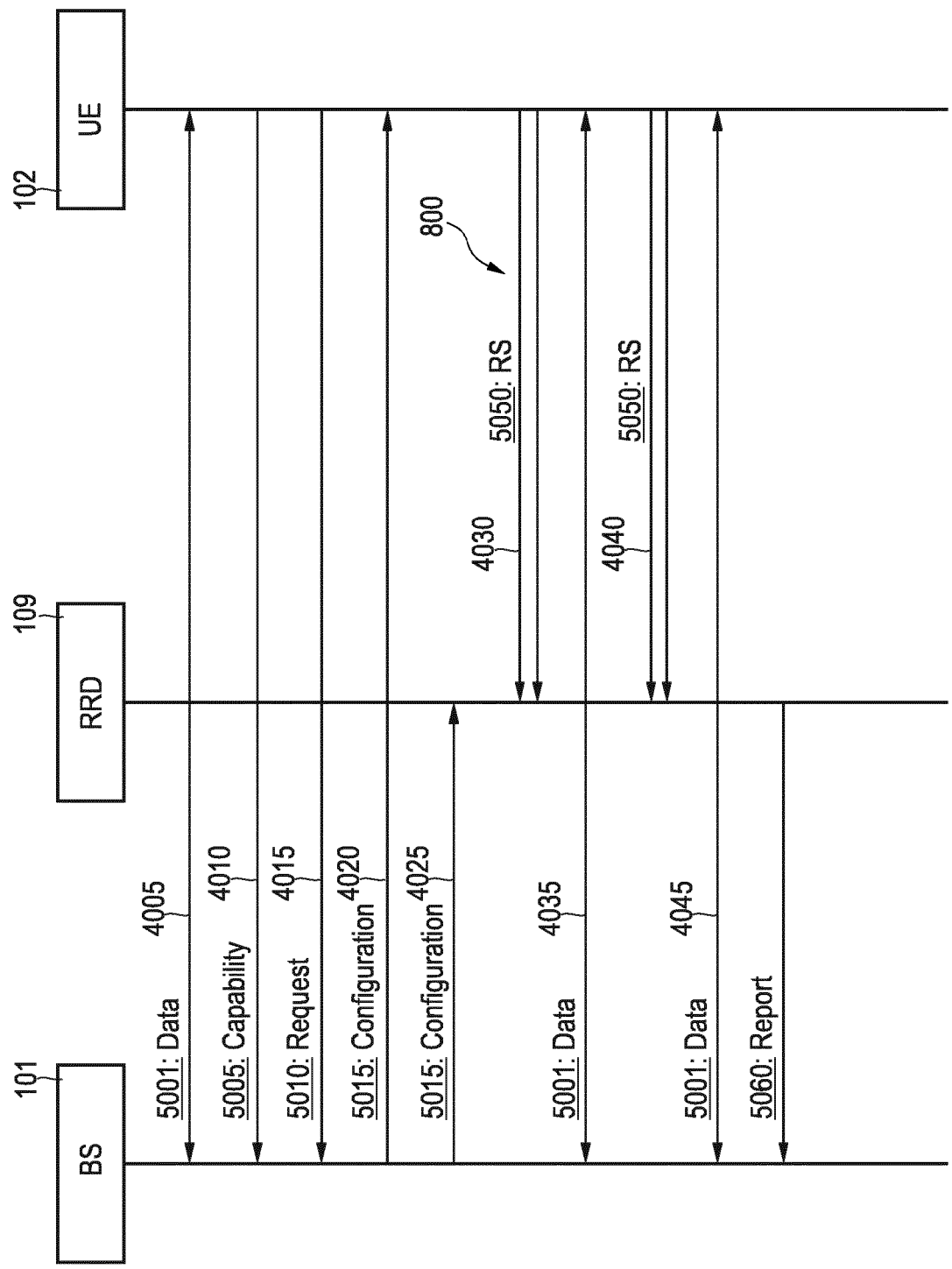
FIG. 8 is a signaling diagram according to various examples.

FIG. 8 is a signaling diagram of communication between the BS 101, the UE 102, and the RRD 109.

At 4005, the BS 101 and the UE 102 communicate payload data 5001 on the data carrier 111.

It is possible that the UE 102, at 4010, provides capability information. This has been discussed in FIG. 6, in connection with box 7105.

Next, it would be optionally possible, that the UE 102, transmits a request 5010 at 4015 to the BS 101, the request 5010 being indicative of a need to facilitate AoA measurements at the RRD 109. For instance, the UE 102 may trigger the request 5010 in response to a degradation of the communication of the payload data 5001. While in the scenario of FIG. 8, it is the UE 102 that transmits the request 5010, alternatively or additionally, it would also be possible that the RRD 109 transmits the request 5010.

As a general rule, the request 5010 is optional. For instance, it would also be possible that the BS 101 judges that there is the need to facilitate the AoA measurements at the RRD 109 without involvement of the UE 102 and/or the RRD 109. For instance, the BS 101 may determine an Automatic Repeat Request failure rate and/or a bit error rate or the like for said communicating of the payload data 5001. Generally, the channel quality of the data carrier 111 between the BS 101 and the UE 102 via the RRD 109 may serve as a decision criterion as to whether or not there is the need to facilitate the AoA measurements.

Then, at 4020, the BS 101 provides the configuration 5015 of the RS transmission to be implemented by the UE 102 to the UE 102. Details have been explained in connection with box 7020 of FIG. 5.

At 4025, it is optionally possible that the configuration 5015, or at least a part thereof, is provided to the RRD 109.

Higher-layer control messages—e.g., Radio Resource Control messages may be used for delivering the configuration 5015 at 4020 and/or 4025. At 4025, a control link established between the BS 101 and the RRD 109 may be used to deliver the configuration 5015, e.g., the control link being established using a Bluetooth or Wi-Fi protocol (cf. TAB. 1, variant A).

Then, at 4030 and 4040, the RS transmission 800 is implemented at the UE 102. This includes transmitting RSs 5050, e.g., using (semi-)persistently allocated or otherwise re-occurring time-frequency resources on the auxiliary carrier 199.

As illustrated in FIG. 7, said communicating between the BS 101 and the UE 102 on the data carrier 111 (e.g., at 4035, there is further payload data 5001 communicated), is time-aligned with the RS transmission 800. For instance, if the UE 102 has limited capability to contemporaneously transmit on the data carrier 111 and the auxiliary carrier 199, a time-duplex scheme can be implemented with respect to the RS transmission 800 and the communicating of the payload data 5001 on the data carrier 111. For example, the data carrier 111 and the auxiliary carrier 199 can use a common timing reference, e.g., defining start positions of transmission frames, etc. They can include a synchronization implemented between the BS 101 and the RRD 109 and/or between the BS 101 and the UE 102.

Based on monitoring the RSs 5050 at 4030 and/or 4040, the RRD 109 can then be configured to provide an appropriate spatial filter that forwards incident signals from the BS 101 in the direction of the UE 102, and vice versa. Thereby, communicating of the payload data 5001 at 4045 is facilitated.

As illustrated in FIG. 8, it would be optionally possible that the RRD 109, at some point, provides a report 5060 that is associated with one or more of the receive properties of the RSs 5050. Then, it would be possible that the BS 101 schedules the communicating on the data carrier 111 based on such report.

Summarizing, dedicated control signaling between the BS and the UE has been disclosed. The control signaling provides a configuration regarding the UE transmitting, e.g., broadcasting, uniquely identifiable RSs for the purpose of selecting the appropriate spatial filter at the RRD.

Here, it would be possible that the UEs connected to the BS on a first carrier frequency associated with the data carrier. Then, the UE can inform the BS that is capable of transmitting RSs at a second carrier frequency associated with the auxiliary carrier.

The BS can then configure the UE to start transmission of an RS, e.g., of beacon signals, with one or more of: a unique identifier; a configurable power level, based on synchronization information. The BS can configure the RRD to estimate, and to reflect toward, the AoA of such a RS received on the second carrier frequency with a configured identifier.

The BS can, at any time, re-configure the UE to turn off/on the RS transmission or to change the identifier optionally the power level. i.e., the configuration can be dynamically set.

It has been shown that the identifier may be an explicit identifier, may be a specific carrier frequency or time pattern or a code-division Multiple Access encoded signal.

The configuration of the UE can be performed as higher-layer control signaling on the first carrier. i.e., it can be transparent to a lower level such as the physical Layer 1, operating on the first carrier frequency.

The second carrier, implementing the auxiliary carrier, could be a Bluetooth or Wi-Fi positioning protocol, a 3GPP positioning RS, a 3GPP supplement link, a discovery signal or a dedicated signal in a licensed/unlicensed frequency band.

The RRD can have one or a set of identifiers it listens to. Likewise, the UE may be re-configured by the BS to match multiple RRDs.

An identifier may be associated with one or multiple polarizations.

An RRD configured with multiple identifiers is assumed to support multiple users simultaneously.

The RRD may report one or more of the following quantities to the BS: AoA; received power level; interference situation on the second carrier. This can be for enhanced scheduling purpose.

The UE loses a communication connection on the auxiliary carrier and the second carrier frequency, there may be a timer. When the timer is expiring, the UE can stop transmission on the auxiliary carrier. The UE can then inform the BS, e.g., using control signaling on the first carrier, that the second carrier frequency is becoming available, upon which the BS may allocate a new second carrier (cf. FIG. 8, request 5010). The BS may provide a new configuration for the RS transmission.

The RS can optionally encode geographic position information of the UE such that the RRD can select the beam towards the UE directly or the assistance of the BS, without AoA estimation.

The transmissions on the data carrier and the auxiliary carrier may be time-synchronized, i.e., transmissions on the first and second carriers may share a common timing reference. For this purpose, the RRD can receive synchronization information from the BS.

The configuration of the reference RS transmission can include a shared identity of the RRD, i.e., contention-based access identities can be possible. This can enable use of the RRD during initial access. The shared identity may be preconfigured list used by multiple UEs in a random-access manner. The broadcasted signal can be reduced to a single bit.

Accordingly, at least the following EXAMPLES have been described above:

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

For illustration, various techniques have been described with respect to an RS transmission implemented at the UE, it would also be possible to implement an RS transmission at the BS. Specifically, it would be possible to, thereby, facilitate angle-of-arrival measurements at the RRD with respect to incident signals from the BS.

The invention claimed is:

1. A method of operating an access node of a communications network, the access node communicating with a wireless communication device via a reconfigurable repeater device (RRD), the RRD being re-configurable to provide multiple spatial filters, each one of the multiple spatial filters being associated with a respective input spatial direction from which incident signals on a data carrier are accepted and with a respective output spatial direction into which incident signals are reflected or amplified by the RRD, the method comprising:

in response to a need to facilitate an angle-of-arrival measurement at the RRD based on reference signals transmitted by the wireless communication device, providing, to the wireless communication device, a configuration of a reference-signal transmission comprising the reference signals, the reference-signal transmission being on an auxiliary carrier different from the data carrier.

2. The method of claim 1, further comprising:
providing the RRD with at least a part of the configuration of the reference-signal transmission.

3. The method of claim 1, wherein the configuration comprises at least one identifier to be indicated by reference signals of the reference-signal transmission.

4. The method of claim 3, wherein use of the at least one identifier is contention-based among a plurality of wireless communication devices.

5. The method of claim 3, wherein the at least one identifier is uniquely associated with the wireless communication device or the RRD.

6. The method of claim 1, wherein the configuration comprises a first configuration of at least one first reference signal of the reference-signal transmission and a second configuration of at least one second reference signal of the reference-signal transmission, wherein the at least one first reference signal is associated with a first polarization of signals on the data carrier and the at least one second reference signal is associated with a second polarization of signals on the data carrier.

7. The method of claim 1, wherein the configuration comprises a transmit power of the reference signals of the reference-signal transmission.

8. The method of claim 1, wherein the configuration comprises repetitive resources for the reference-signal transmission.

9. The method of claim 1, wherein the configuration comprises discovery information for establishing a communication connection between the wireless communication device and the RRD.

10. The method of claim 1, wherein the configuration is provided using a higher-layer control message communicated on the data carrier.

11. The method of claim 1, wherein the wireless communication device is provided with the configuration in response to a respective capability signaling from the wireless communication device.

12. The method of claim 1, wherein the need to facilitate the angle-of-arrival measurement at the RRD is determined based on control signaling from the RRD and/or the wireless communication device to the access node.

13. The method of claim 12, wherein the control signaling is indicative of termination of a communication connection established between the wireless communication device and the RRD using the auxiliary carrier.

14. The method of claim 1, further comprising:
receiving, from the RRD, a report associated with the reference signals of the reference-signal transmission, and
scheduling said communicating with the wireless communication device based on the report.

15. The method of claim 1, further comprising:
time-aligning said communicating with the wireless communication device and the reference-signal transmission.

16. A method of operating a wireless communication device connectable to a communications network, the wireless communication device communicating with an access node of the communications network via a re-configurable repeater device (RRD), the RRD being re-configurable to provide multiple spatial filters, each one of the multiple spatial filters being associated with a respective input spatial direction from which incident signals on a data carrier are accepted and with a respective output spatial direction into which incident signals are reflected or amplified by the RRD, the method comprising:
obtaining, from the access node, a configuration of a reference-signal transmission; and
transmitting reference signals of the reference-signal transmission to the RRD in accordance with the configuration, to facilitate an angle-of-arrival measurement at the RRD.

17. A method of operating a re-configurable repeater device (RRD), the RRD being reconfigurable to provide multiple spatial filters, each one of the multiple spatial filters being associated with a respective input spatial direction from which incident signals on a data carrier are acceptable and with a respective output spatial direction into which incident signals are reflected or amplified by the RRD, the method comprising:
obtaining at least a part of a configuration of a reference-signal transmission by a wireless communication device,
monitoring for reference signals of the reference-signal transmission based on the at least a part of the configuration,
determining an angle-of-arrival of the reference signals based on said monitoring, and
re-configuring to provide a selected spatial filter of the multiple spatial filters based on the angle-of-arrival.

* * * * *